No. 722,107. PATENTED MAR. 3, 1903.
W. L. HOLLAR.
FEED TROUGH.
APPLICATION FILED MAY 27, 1902.
NO MODEL.
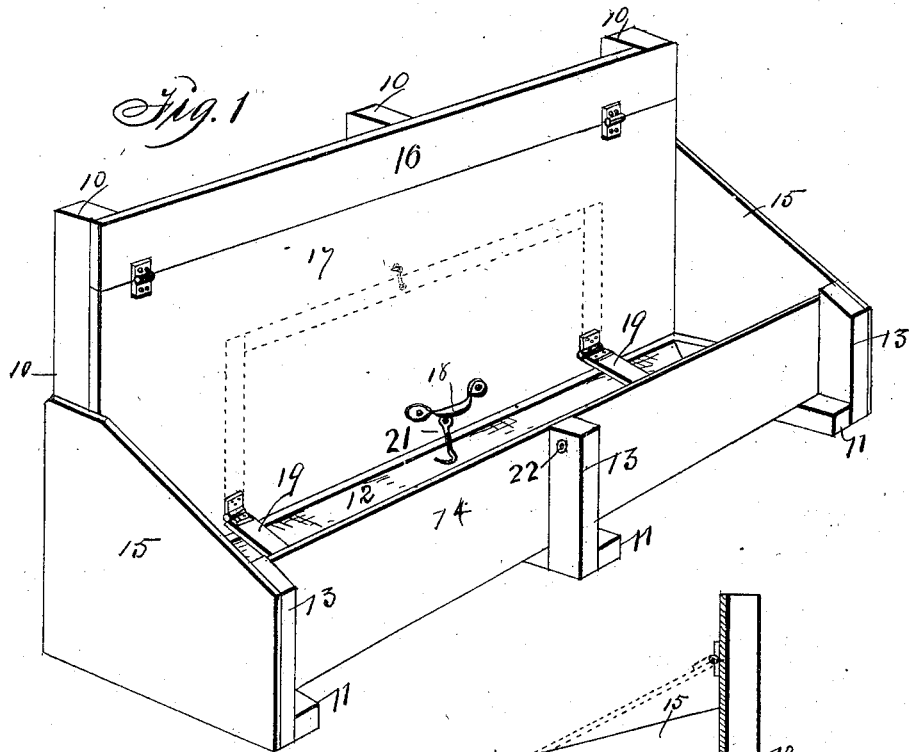
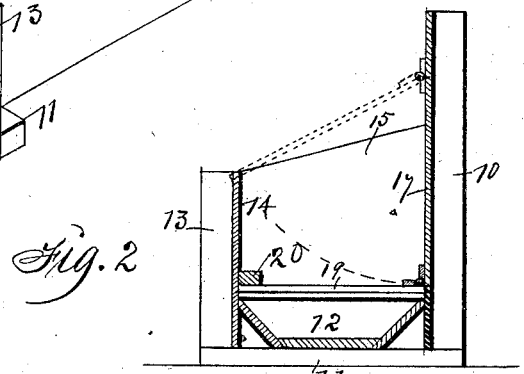
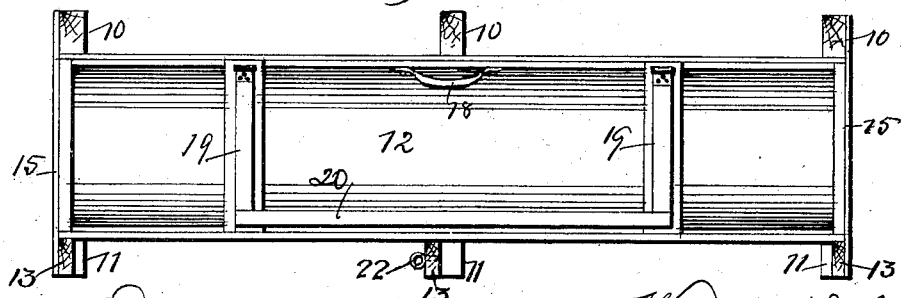
Witnesses: Charles E. Corbett, A. H. Orwig.
Inventor: William L. Hollar, By Thomas G. Orwig, Attorney.

UNITED STATES PATENT OFFICE.

WILLIAM L. HOLLAR, OF HUMBOLDT, IOWA.

FEED-TROUGH.

SPECIFICATION forming part of Letters Patent No. 722,107, dated March 3, 1903.

Application filed May 27, 1902. Serial No. 109,158. (No model.)

*To all whom it may concern:*

Be it known that I, WILLIAM L. HOLLAR, a citizen of the United States, residing at Humboldt, in the county of Humboldt and State of Iowa, have invented a new and useful Feed-Trough for Hogs, Sheep, and Cattle, of which the following is a specification.

My object is to connect a feed-trough with a fence or wall of a building in such a manner that the trough can be readily closed and locked to prevent animals from getting access thereto while the trough is being cleaned or feed being placed in the trough or until such time as it may be desired to open the passage-way through the fence or wall that will allow them to feed from the trough.

A further object is to prevent anything entering the trough from the outside until it is desired to get access thereto for cleaning it and putting in food for the animals behind the trough.

My invention consists in the construction, arrangement, and combination of parts, as hereinafter set forth, pointed out in my claims, and illustrated in the accompanying drawings, in which—

Figure 1 is a perspective view showing the trough open as required for placing food therein and closed to animals in rear of it. Fig. 2 is a central transverse sectional view showing the hinged section locked in a vertical position and dotted lines indicating the positions of the hinged cover and locking device when the trough is closed in front. Fig. 3 is a top plan view showing the position of the trough and hinged cover and locking device relative to a panel of fence or section of the wall of a building to which the trough is fixed.

The numerals 10 designate the fixed posts of a fence or uprights in the wall of a building, to which are fixed at their bottoms base-pieces 11 to support the trough 12 placed thereon. To the front ends of the horizontal base-pieces 11 are fixed short uprights 13, and to their inside faces is fixed a board 14 to extend upward above the front top edge of the trough to prevent animals in rear of the trough from throwing food out in front of the trough when they are feeding. To the end uprights 10 and 13 are fixed boards 15 to aid, in combination with a hinged door, to close the trough as required to prevent access thereto from the front. To the tops of the posts or uprights 10 is fixed a board 16 to brace the posts, and to the lower edge of said board is hinged a section of wall or door 17, that in its vertical position comes in contact with the rear side of the trough 12, as required, to prevent animals in rear of the trough from gaining access to the trough. A handle 18, fixed to the door 17, facilitates adjusting the door as required in alternately opening and closing the trough in its front and rear. A frame and locking device, composed of two mating bars 19, hinged at their rear ends to the lower portion of the door 17, and a bar 20, fixed to their front ends, serve when in a horizontal position to lock the hinged door 17, as required, to retain it in a perpendicular position to close the rear side of the trough. To unlock it, the frame is turned up and fastened against the hinged cover 17, as indicated by dotted lines in Fig. 1. To retain the hinged section 17 in an inclined position, as indicated by dotted lines in Fig. 2, a hook 21 is pivoted to the section and an eye or staple 22 fixed to the front 14 of the trough, as shown in Fig. 1, or in any suitable way, so the hook can enter the staple.

Having thus described the purpose of my invention and its construction and operation, the practical utility thereof will be readily understood by persons familiar with the art to which it pertains.

What I claim as new, and desire to secure by Letters Patent, is—

1. In a feed-trough, a panel of fence, fixed posts, a trough between the posts, a board fixed to the tops of the posts, a section of panel hinged to the fixed board at the tops of the posts to swing forward, a locking device hinged to the front and lower portion of the hinged section, means for fastening the hinged locking device flat against the front and lower portion of the hinged section, and means for fastening the hinged locking device to the front of the trough, arranged and combined as shown and described for the purposes stated.

2. A feed-trough for animals fixed to the front and bottom of a fence or wall, a board fixed to the posts at the ends of the trough, a section of the fence hinged to the said board to swing forward over the trough, base-pieces fixed to the posts for supporting a trough, a trough on said base-pieces, a wall fixed to the ends and front of the trough, a frame hinged to the front of the lower portion of the hinged section of fence for locking the hinged section in a perpendicular position to close access at the rear of the trough and means for fastening said hinged section to the wall in front of the trough when swung forward to close access at the front of the trough, arranged and combined to operate in the manner set forth for the purposes stated.

WILLIAM L. HOLLAR.

Witnesses:
 W. W. STERNS,
 M. E. TREMAIN.